(12) United States Patent
Thakur et al.

(10) Patent No.: US 9,697,730 B2
(45) Date of Patent: Jul. 4, 2017

(54) SPATIAL CLUSTERING OF VEHICLE PROBE DATA

(71) Applicant: Nissan North America, Inc., Franklin, TN (US)

(72) Inventors: Siddharth Thakur, Milpitas, CA (US); Daisuke Saito, Sunnyvale, CA (US)

(73) Assignee: NISSAN NORTH AMERICA, INC., Franklin, TX (US)

( * ) Notice: Subject to any disclaimer, the term of this patent is extended or adjusted under 35 U.S.C. 154(b) by 0 days.

(21) Appl. No.: 14/657,082

(22) Filed: Mar. 13, 2015

(65) Prior Publication Data

US 2016/0225255 A1 Aug. 4, 2016

Related U.S. Application Data

(63) Continuation-in-part of application No. 14/609,745, filed on Jan. 30, 2015.

(51) Int. Cl.
*G08G 1/01* (2006.01)
*G01C 21/20* (2006.01)
(Continued)

(52) U.S. Cl.
CPC ....... *G08G 1/0137* (2013.01); *B62D 15/0285* (2013.01); *G01C 21/32* (2013.01);
(Continued)

(58) Field of Classification Search
CPC ........ G06Q 50/30; G08G 1/14; G08G 1/0112; G08G 1/0137; G01C 21/3423; G01C 21/32; G07B 15/02; B62D 15/0285; G05D 1/0274; G05D 2201/0213; G05D 1/0278; G01S 19/42
(Continued)

(56) References Cited

U.S. PATENT DOCUMENTS 4,656,950 A 4/1987 Rhoton
5,910,782 A 6/1999 Schmitt et al.
(Continued)

FOREIGN PATENT DOCUMENTS

EP 2568310 A2 3/2013
JP 2013-182551 A 9/2013
WO 2013-169182 A1 11/2013

*Primary Examiner* — Nga X Nguyen
(74) *Attorney, Agent, or Firm* — Young Basile Hanlon & MacFarlane, P.C.

(57) ABSTRACT

A method and apparatus for identifying parking areas may include identifying a plurality of coordinates representing vehicle spatial data, partitioning the plurality of coordinates into at least two groups of vehicle locations based on at least one condition existing when the plurality of coordinates was identified, clustering the vehicle spatial data for a first group of the at least two groups of vehicle locations based on proximity, comparing dimensions of the clustered vehicle spatial data for the first group with other location data within the vehicle transportation network information, and defining a respective location of the clustered vehicle spatial data as a parking area of a plurality of parking areas. Each parking area is associated with a respective location in a vehicle transportation network. The parking area information may be used in the identification of a route from an origin to a primary destination.

21 Claims, 9 Drawing Sheets

(51) Int. Cl.
  *G01C 21/26*  (2006.01)
  *G01S 19/42*  (2010.01)
  *G05D 1/00*   (2006.01)
  *G05D 1/02*   (2006.01)
  *G08G 1/14*   (2006.01)
  *G01C 21/32*  (2006.01)
  *B62D 15/02*  (2006.01)

(52) U.S. Cl.
  CPC .......... *G05D 1/0274* (2013.01); *G08G 1/0112* (2013.01); *G01S 19/42* (2013.01); *G05D 1/0278* (2013.01); *G05D 2201/0213* (2013.01)

(58) Field of Classification Search
  USPC ........................................ 701/408, 430, 454
  See application file for complete search history.

(56) References Cited

U.S. PATENT DOCUMENTS

| | | |
|---|---|---|
| 6,308,133 B1 | 10/2001 | Loffert et al. |
| 6,438,472 B1 | 8/2002 | Tano et al. |
| 6,640,188 B2 | 10/2003 | Hashida |
| 7,516,010 B1* | 4/2009 | Kaplan ............... G01C 21/30 340/932.2 |
| 7,783,421 B2 | 8/2010 | Arai et al. |
| 8,024,112 B2 | 9/2011 | Krumm et al. |
| 8,452,771 B2 | 5/2013 | Kurciska et al. |
| 8,566,029 B1 | 10/2013 | Lopatenko et al. |
| 8,606,492 B1 | 12/2013 | Botnen |
| 8,634,980 B1 | 1/2014 | Urmson et al. |
| 8,655,588 B2 | 2/2014 | Wong et al. |
| 8,694,232 B2 | 4/2014 | Kono et al. |
| 8,768,539 B1 | 7/2014 | Clement et al. |
| 8,896,685 B2 | 11/2014 | Ihara et al. |
| 9,058,703 B2 | 6/2015 | Ricci |
| 9,151,628 B1 | 10/2015 | Saito et al. |
| 9,418,491 B2 | 8/2016 | Phillips |
| 2005/0071082 A1 | 3/2005 | Ohmura et al. |
| 2006/0184013 A1 | 8/2006 | Emanuel et al. |
| 2008/0109127 A1 | 5/2008 | Ozaki |
| 2009/0030885 A1 | 1/2009 | DePasquale et al. |
| 2009/0125174 A1 | 5/2009 | Delean |
| 2009/0174540 A1 | 7/2009 | Smith |
| 2010/0109445 A1 | 5/2010 | Kurs et al. |
| 2010/0256836 A1 | 10/2010 | Mudalige |
| 2010/0256908 A1 | 10/2010 | Shimshoni et al. |
| 2011/0106429 A1 | 5/2011 | Poppen et al. |
| 2012/0089326 A1 | 4/2012 | Bouve |
| 2012/0256588 A1 | 10/2012 | Hayashi et al. |
| 2012/0271778 A1 | 10/2012 | Atkins et al. |
| 2012/0303254 A1 | 11/2012 | Kirsch et al. |
| 2013/0060461 A1 | 3/2013 | Wong et al. |
| 2013/0073112 A1 | 3/2013 | Phelan et al. |
| 2013/0073114 A1 | 3/2013 | Nemat-Nasser et al. |
| 2013/0211699 A1 | 8/2013 | Scharmann et al. |
| 2013/0211705 A1 | 8/2013 | Geelen et al. |
| 2013/0231824 A1 | 9/2013 | Wilson et al. |
| 2013/0344856 A1 | 12/2013 | Silver et al. |
| 2014/0036076 A1 | 2/2014 | Nerayoff et al. |
| 2014/0058634 A1 | 2/2014 | Wong et al. |
| 2014/0113619 A1 | 4/2014 | Tibbitts et al. |
| 2014/0180727 A1 | 6/2014 | Freiberger et al. |
| 2014/0236719 A1 | 8/2014 | Szostak et al. |
| 2014/0285361 A1* | 9/2014 | Tippelhofer ........... G08G 1/143 340/932.2 |
| 2014/0320318 A1 | 10/2014 | Victor et al. |
| 2014/0350853 A1 | 11/2014 | Proux |
| 2015/0039391 A1 | 2/2015 | Hershkovitz et al. |
| 2015/0106010 A1 | 4/2015 | Martin et al. |
| 2015/0134185 A1 | 5/2015 | Lee |
| 2015/0141043 A1 | 5/2015 | Abramson et al. |
| 2015/0237662 A1 | 8/2015 | Fischer |
| 2015/0248131 A1 | 9/2015 | Fairfield et al. |
| 2015/0248689 A1 | 9/2015 | Paul et al. |
| 2015/0319093 A1 | 11/2015 | Stolfus |
| 2015/0346718 A1 | 12/2015 | Stenneth |
| 2015/0377635 A1 | 12/2015 | Beaurepaire et al. |
| 2016/0003636 A1 | 1/2016 | Ng-Thow-Hing et al. |
| 2016/0047660 A1 | 2/2016 | Fausten |
| 2016/0055419 A1 | 2/2016 | Fischer et al. |
| 2016/0071333 A1 | 3/2016 | Haidar et al. |
| 2016/0125673 A1 | 5/2016 | Bromham et al. |
| 2016/0144865 A1 | 5/2016 | Stadler |
| 2016/0247095 A1 | 8/2016 | Scicluna et al. |
| 2016/0253707 A1 | 9/2016 | Momin et al. |

* cited by examiner

SPATIAL CLUSTERING OF VEHICLE PROBE DATA

CROSS-REFERENCE TO RELATED APPLICATION

This application is a continuation-in-part of U.S. patent application Ser. No. 14/609,745, the entire content of which is incorporated herein in its entirety by reference.

TECHNICAL FIELD

This disclosure relates to vehicle operation, including routing and navigation.

BACKGROUND

A vehicle may include a control system that may generate and maintain the route of travel and may control the vehicle to traverse the route of travel. An autonomous vehicle may be controlled autonomously, without direct human intervention, to traverse a route of travel from an origin to a destination. Even when traveling to the same destination, noise and other factors can result in different position data once at the destination. This makes it difficult to extract any insight from the data or develop any service on the data.

SUMMARY

Disclosed herein are aspects, features, elements, implementations and embodiments of spatially clustering vehicle probe data to, for example, identify parking areas for association with destinations based on map data.

According to an aspect of the disclosed embodiments, a vehicle includes a processor that is configured to execute instructions stored on a non-transitory computer readable medium to identify vehicle transportation network information representing a vehicle transportation network, the vehicle transportation network including a primary destination, wherein identifying the vehicle transportation network information includes identifying the vehicle transportation network information such that the vehicle transportation network information includes parking area information representing a plurality of parking areas, determine a target parking area from the plurality of parking areas as the primary destination based on the vehicle transportation network information, and identify a route from an origin to the primary destination in the vehicle transportation network using the vehicle transportation network information. Each parking area from the plurality of parking areas is associated with a respective location in the vehicle transportation network by identifying a plurality of coordinates representing vehicle spatial data, partitioning the plurality of coordinates into at least two groups of vehicle locations based on at least one condition existing when the plurality of coordinates was identified, clustering the vehicle spatial data for a first group of the at least two groups of vehicle locations based on proximity, comparing dimensions of the clustered vehicle spatial data for the first group with other location data within the vehicle transportation network information, and defining a respective location of the clustered vehicle spatial data as a parking area of the plurality of parking areas. A trajectory controller may be configured to route a vehicle to travel from the origin to the primary destination using the route.

Another aspect of the disclosed embodiments is a vehicle including a processor configured to execute instructions stored on a non-transitory computer readable medium to identify vehicle transportation network information representing a vehicle transportation network, the vehicle transportation network including a primary destination, wherein identifying the vehicle transportation network information includes identifying the vehicle transportation network information such that the vehicle transportation network information includes parking area information representing a plurality of parking areas, wherein each parking area from the plurality of parking areas is associated with a respective location in the vehicle transportation network by identifying a plurality of coordinates representing vehicle spatial data from a plurality of vehicles, partitioning the plurality of coordinates into at least two groups of vehicle locations based on at least one condition existing when the plurality of coordinates was identified, wherein the at least one condition comprises a time of day, clustering the vehicle spatial data for a first group of the at least two groups of vehicle locations based on proximity, comparing dimensions of the clustered vehicle spatial data for the first group with other location data within the vehicle transportation network information, and defining a respective location of the clustered vehicle spatial data as a parking area of the plurality of parking areas. The processor may further determine a target parking area from the plurality of parking areas as the primary destination based on the vehicle transportation network information and identify a route from an origin to the primary destination in the vehicle transportation network using the vehicle transportation network information. A trajectory controller may be configured to route the vehicle to travel from the origin to the primary destination using the route.

Another aspect of the disclosed embodiments is a system for generating vehicle transportation network information that may include a memory including a non-transitory computer readable medium and a processor configured to execute instructions stored on the non-transitory computer readable medium to identify vehicle transportation network information representing a vehicle transportation network and automatically associate each parking area of a plurality of parking areas with a respective location in the vehicle transportation network by identifying a plurality of coordinates representing vehicle spatial data, partitioning the plurality of coordinates into at least two groups of vehicle locations based on at least one condition existing when the plurality of coordinates was identified, clustering the vehicle spatial data for a first group of the at least two groups of vehicle locations based on proximity, comparing dimensions of the clustered vehicle spatial data for the first group with other location data within the vehicle transportation network information, and defining a respective location of the clustered vehicle spatial data as a parking area of the plurality of parking areas. The processor is further configured to update the vehicle transportation network information based on the automatically identified associations between the parking areas and the respective locations.

Variations in these and other aspects, features, elements, implementations and embodiments of the methods, apparatus, procedures and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which:

FIG. 8A illustrates input points into the method, FIG. 8B illustrates the output of a Delaunay triangulation of the partitioned input points of FIG. 8A and the limits of a known parking area, FIG. 8C illustrates selected Delaunay edges for defining a cluster; and FIG. 8D illustrates a comparison of the size of a defined cluster with that of the known parking area of FIG. 8B.

DETAILED DESCRIPTION

Figure 1:
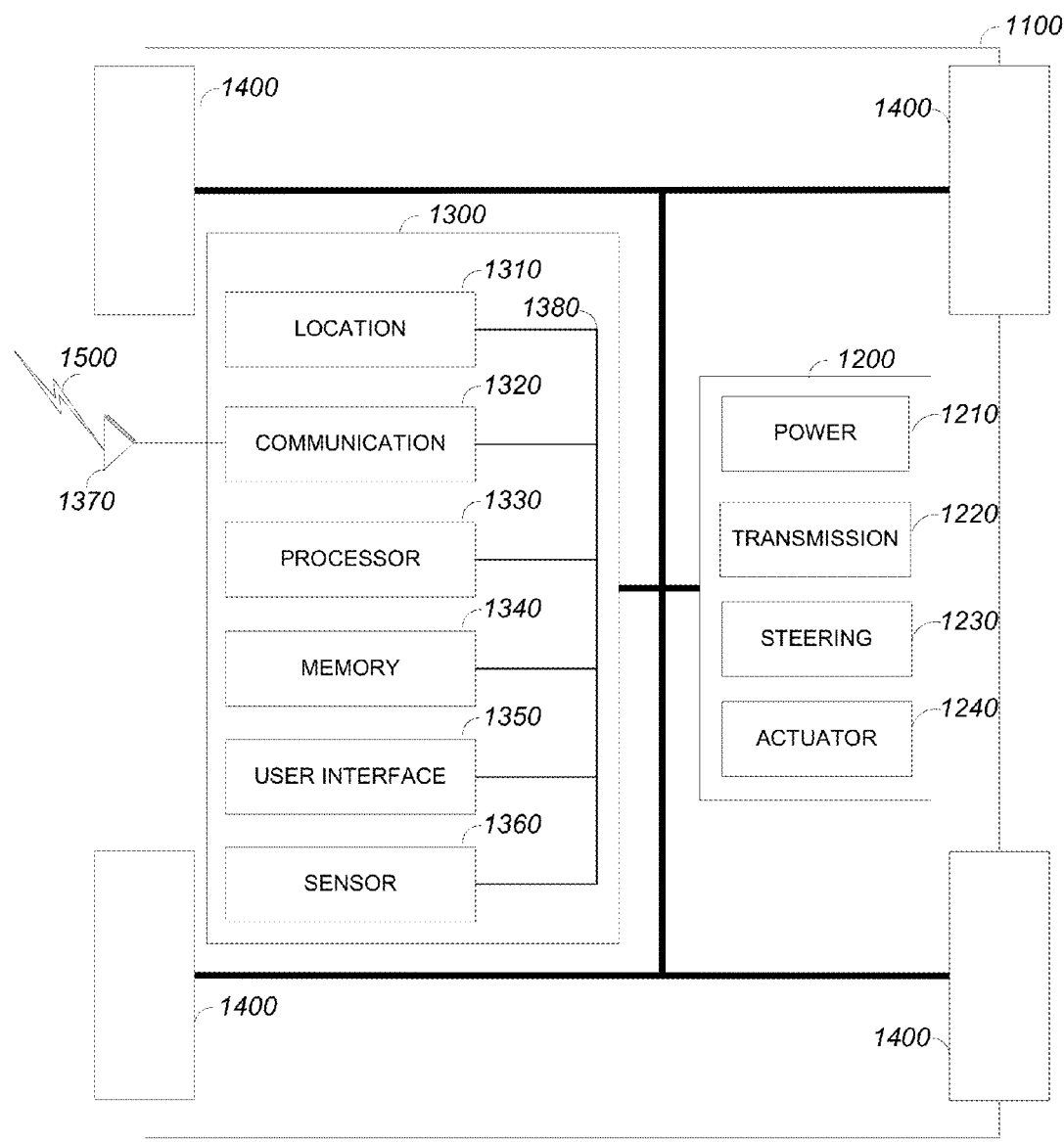
FIG. 1 is a diagram of an example of a portion of an autonomous vehicle in which the aspects, features and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, the vehicle transportation network information may omit information expressly identifying a parking location for the destination. Telemetry data of the vehicle provides information such as a trip summary that contains start and stop locations, timestamps and other relevant data fields. However, the signal data from the vehicle indicating position is susceptible to noise. Thus, even if the vehicle is parked in the same parking lot over time, its coordinates may be different. To understand the usage patterns, recognizing these coordinates as the belonging to the same end location, i.e., a parking area or lot, is desirable. This parking area information may then be used for various purposes, such as trip routing, etc.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features and elements are described herein in particular combinations, each aspect, feature or element may be used independently or in various combinations with or without other aspects, features and elements.

FIG. 1 is a diagram of an example of an autonomous vehicle in which the aspects, features and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axels, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the autonomous vehicle 1000. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensors 1360, such as an array of sensors, which may be operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include one or more sensors that are operable to obtain information regarding the physical environment surrounding the vehicle 1000. For example, one or more sensors 1360 may detect road geometry and obstacles, such as fixed obstacles, vehicles and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
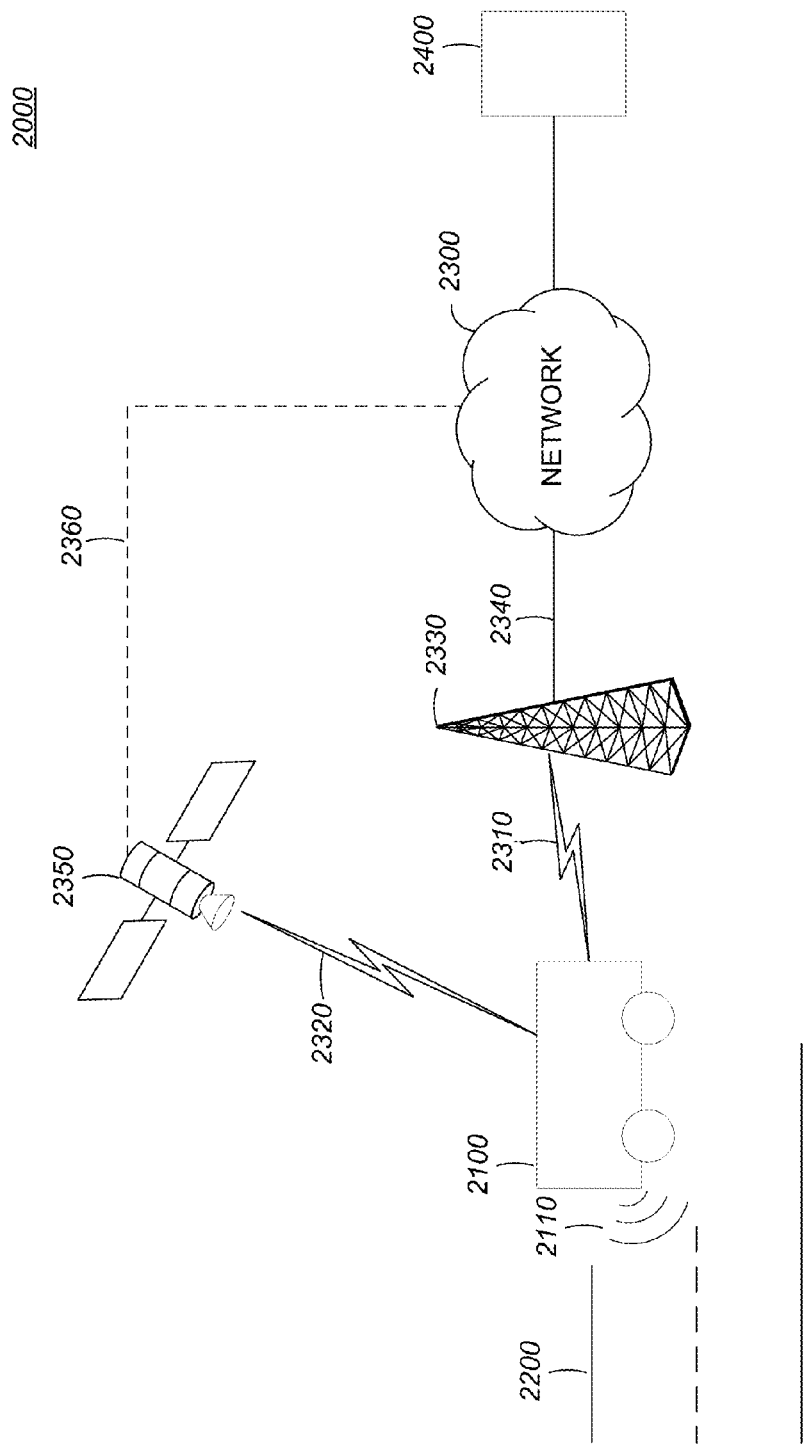
FIG. 2 is a diagram of an example of a portion of an autonomous vehicle transportation and communication system in which the aspects, features and elements disclosed herein may be implemented.

FIG. 2 is a diagram of an example of a portion of an autonomous vehicle transportation and communication system in which the aspects, features and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. The access point 2330, which may include a computing device, may be configured to communicate with an autonomous vehicle 2100, with a communication network 2300, with one or more communicating devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, the access point 2330 may include any number of interconnected elements.

In some embodiments, the autonomous vehicle 2100 may communicate with the communications network 2300 via a satellite 2350, or other non-terrestrial communication device. The satellite 2350, which may include a computing device, may be configured to communicate with an autonomous vehicle 2100, with a communication network 2300, with one or more communicating devices 2400, or with a combination thereof via one or more communication links 2320/2360. Although shown as a single unit, the satellite 2350 may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle 200 may include one or more on-vehicle sensors 2110, such as sensor(s) 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, the autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although for simplicity FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units or elements not shown in FIG. 2. Although the autonomous vehicle 2100 is shown as a single unit, the autonomous vehicle 2100 may include any number of interconnected elements.

Figure 3:
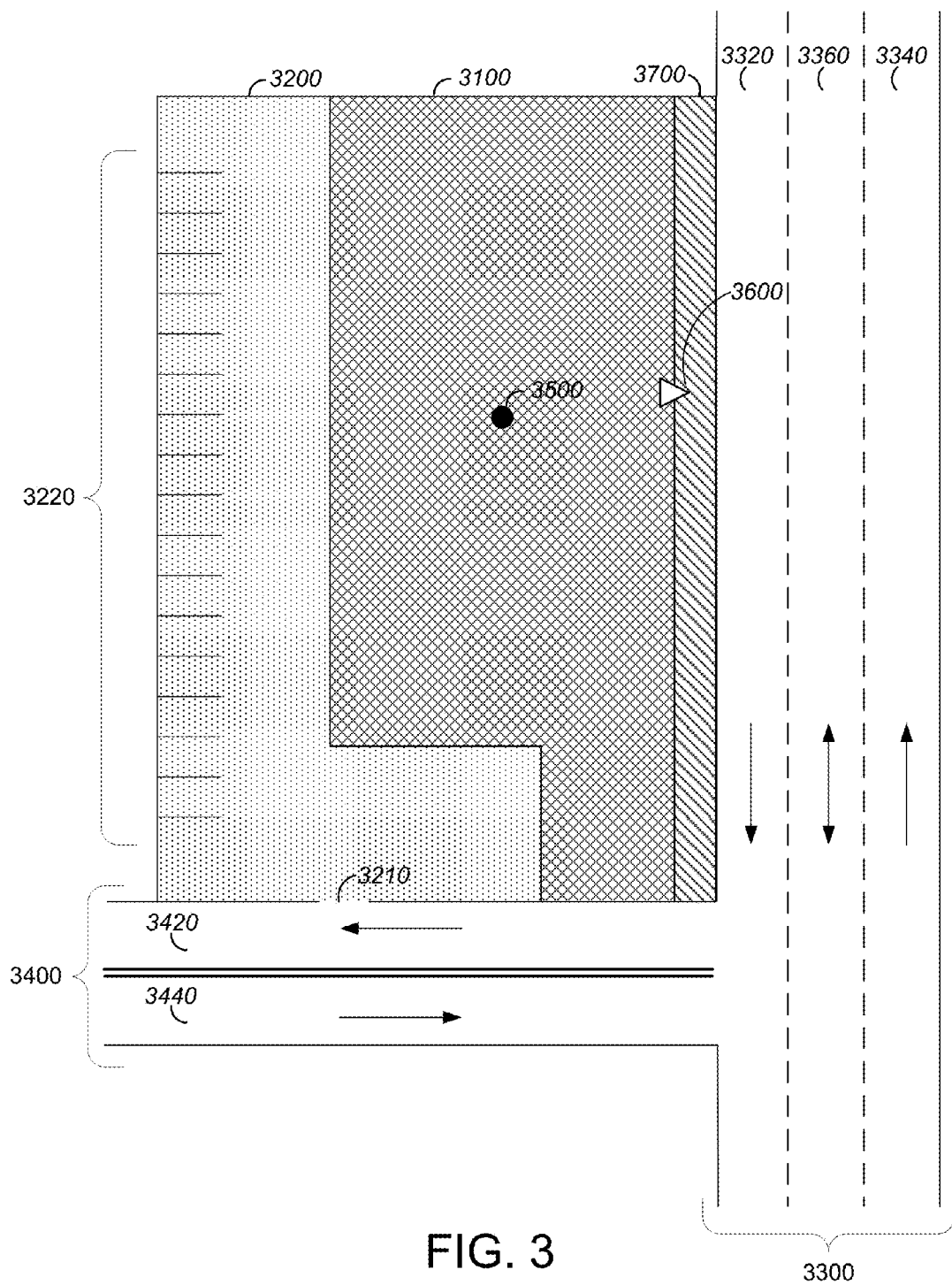
FIG. 3 is a diagram of a portion of a vehicle transportation network in accordance with this disclosure.

FIG. 3 is a diagram of a portion of a vehicle transportation network 3000 in accordance with this disclosure. A vehicle transportation network 3000 may include one or more unnavigable areas, such as a building 3100, one or more partially navigable areas, such as parking area 3200, one or more navigable areas, such as roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400 may include one or more lanes 3320/3340/3360/3420/3440, and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information may identify the building 3100 as a point of interest, an autonomous vehicle may identify the point of interest as a destination, and the autonomous vehicle may travel from an origin to the destination by traversing the vehicle transportation network.

In some embodiments, identifying a destination may include identifying a location for the destination, which may be a discrete uniquely identifiable geolocation, such as the geographic location 3500 for the building 3100. For example, the vehicle transportation network may include a defined location, such as a street address, a postal address, a vehicle transportation network address, a longitude and latitude, or a GPS address, for the destination.

In some embodiments, a destination may be associated with one or more entrances, such as the entrance 3600 shown in FIG. 3. In some embodiments, the vehicle transportation network information may include defined or predicted entrance location information, such as information identifying a geolocation of an entrance associated with a destination.

In some embodiments, the vehicle transportation network may be associated with, or may include, a pedestrian transportation network. For example, FIG. 3 includes a portion 3700 of a pedestrian transportation network, which may be a pedestrian walkway. In some embodiments, a pedestrian transportation network, or a portion thereof, such as the portion 3700 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

In some embodiments, a parking area, such as the parking area 3200, may be associated with a destination, such as the building 3100. For example, the vehicle transportation network information may include defined parking area information indicating that one or more parking areas are associated with a destination. In some embodiments, the vehicle transportation network information may omit information identifying the parking area 3200 or information associating the parking area 3200 with a destination.

In an example, the vehicle transportation network information may include information identifying the parking area 3200 as a navigable or partially navigable portion of the vehicle transportation network, may include information identifying the parking area 3200 as a parking area, and may include defined parking area association information describing an association between a destination, such as the building 3100, and the parking area 3200. Defined parking area association information may be parking area association information generated in response to user input expressly defining or creating the parking area association information.

In another example, the vehicle transportation network information may include information identifying the parking area 3200 as a navigable or partially navigable portion of the vehicle transportation network, may include information identifying the parking area 3200 as a parking area, and may include automatically generated parking area association information describing an association between a destination, such as the building 3100, and the parking area 3200. The vehicle transportation network information may omit information identifying an area as a parking area, and automatically generating parking area association information may include automatically generating information identifying an area as a parking area. That is, identifying the parking area 3200 as a parking area may be done automatically as described herein.

Figure 4:
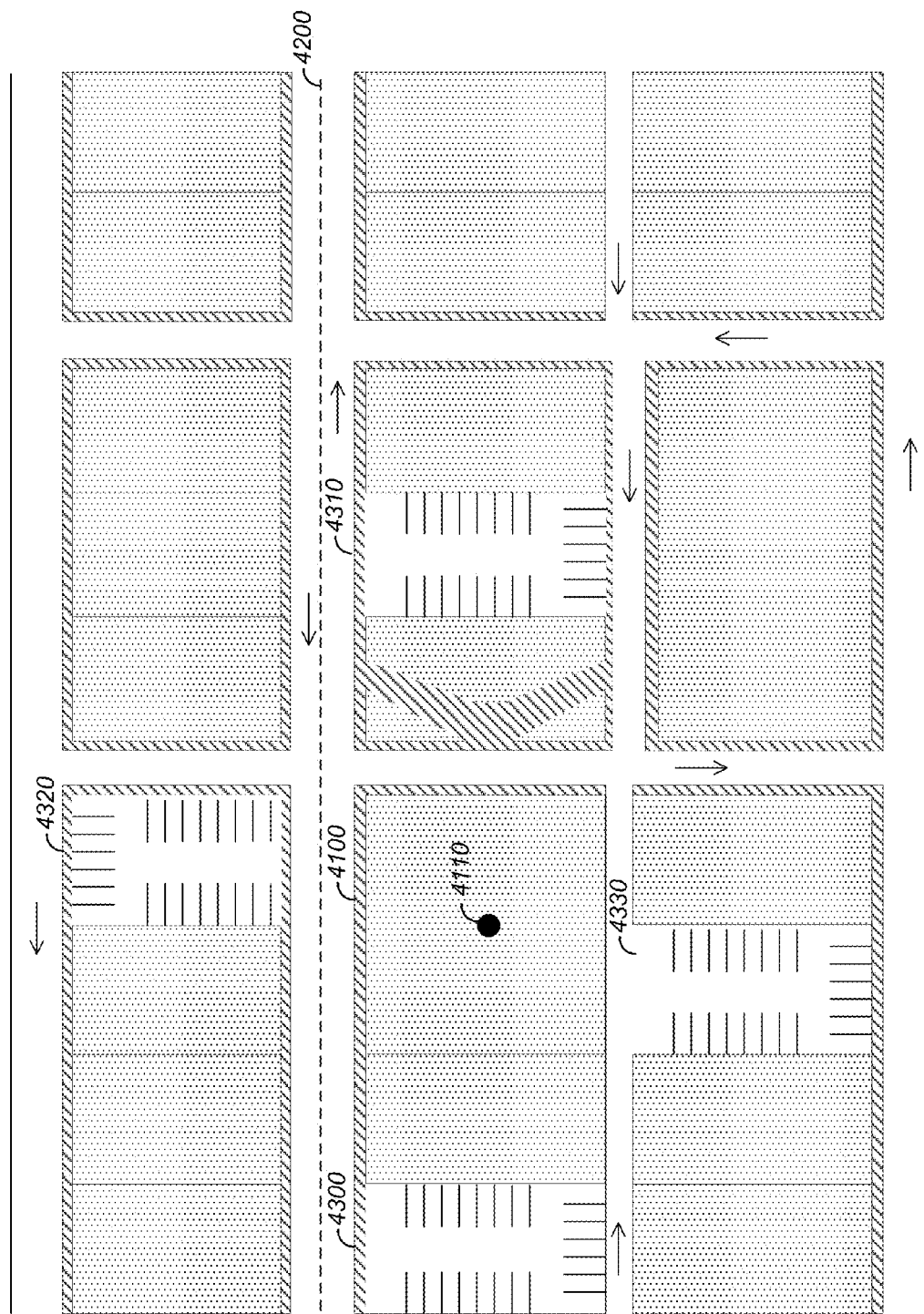
FIG. 4 is a diagram of another portion of a vehicle transportation network in accordance with this disclosure.

FIG. 4 is a diagram of another portion of a vehicle transportation network in accordance with this disclosure. The portion of the vehicle transportation network, as shown in FIG. 4, may include one or more unnavigable areas, such as a building 4100, one or more navigable areas, such as roads 4200, one or more partially navigable areas, such as parking areas 4300/4310/4320/4330, or a combination thereof. In some embodiments, the vehicle transportation network information may include location information for a destination, such as the location 4110 for the building 4100.

In some embodiments, a parking location may be associated with, or dedicated to, a destination. For example, the parking area 3200 shown in FIG. 3 may be dedicated to the building 3100 shown in FIG. 3. In some embodiments, a destination may not be associated with a parking area dedicated to the destination. For example, the parking areas 4300/4310/4320/4330 shown in FIG. 4 may not be dedicated to a particular building, destination, or point of interest.

In some embodiments, an association, or relationship, between a building and a parking area may be described in the vehicle transportation network information as defined parking area association information. In some embodiments, the vehicle transportation network information may omit defined parking area association information, and an association, or relationship, between a building and a parking area may be described in the vehicle transportation network information as automatically generated parking area association information. For example, the vehicle transportation network information representing the portion of the vehicle transportation network shown in FIG. 4 may include automatically generated parking area association information indicating that the parking areas 4300/4310/4320/4330 are parking areas for the building 4100.

Figure 5:
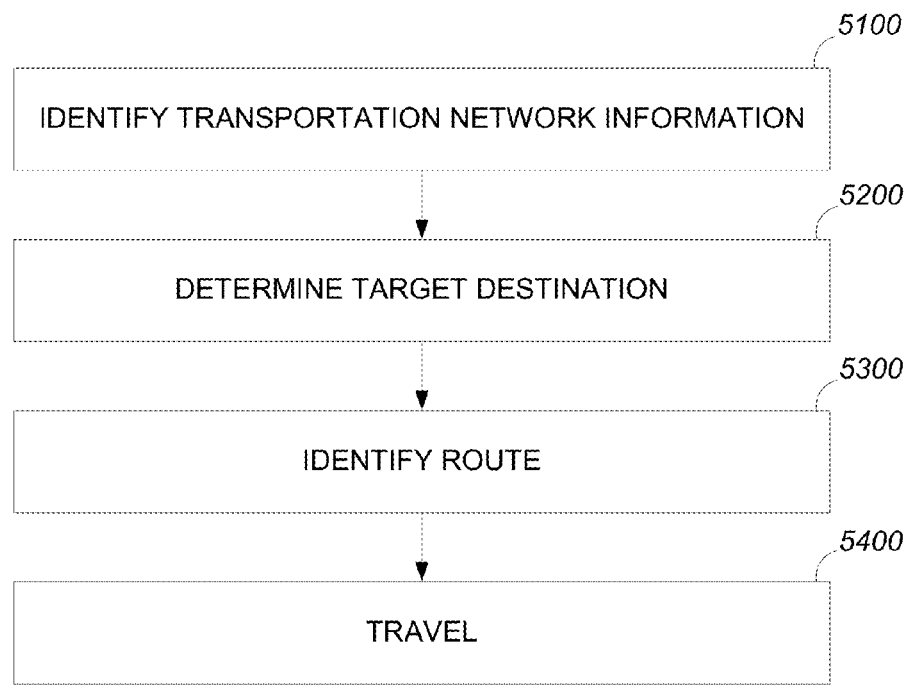
FIG. 5 is a diagram of a method of autonomous vehicle navigation and routing in accordance with this disclosure.

FIG. 5 is a diagram of a method of autonomous vehicle navigation and routing in accordance with this disclosure. Autonomous vehicle navigation and routing may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle navigation and routing. Implementations of autonomous vehicle navigation and routing may include identifying vehicle transportation network information at 5100, determining a target parking location at 5200, identifying a route at 5300, traveling at 5400, or a combination thereof.

In some embodiments, vehicle transportation network information, such as the vehicle transportation network information shown in FIG. 3 or the vehicle transportation network shown in FIG. 4, may be identified at 5100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, identifying the vehicle transportation network information may include transcoding or reformatting the vehicle transportation network information, storing the reformatted vehicle transportation network information, or both.

In some embodiments, the vehicle transportation network information may include parking area information representing one or more parking areas within the vehicle transportation network. In some embodiments, the autonomous vehicle may identify the vehicle transportation network information such that the vehicle transportation network information includes defined parking area association information, automatically generated parking area association information, or a combination thereof.

In some embodiments, a destination may be identified at 5200. Identifying a destination may include identifying a point of interest, such as the building 3100 shown in FIG. 3, or the location 4110 of the building 4100 shown in FIG. 4, as a primary destination, and identifying a target parking location for the point of interest as a secondary destination, or identifying both a primary and a secondary destination.

In some embodiments, the target parking location for the primary destination within the vehicle transportation network may be identified at 5200 based on the vehicle transportation network information. For example, a building, such as the building 3100 shown in FIG. 3, may be identified as the primary destination, and a parking location, such as the parking area 3200 shown in FIG. 3, may be identified as the target parking location based on defined parking area association information. In some embodiments, the target parking location may be identified based on automatically generated parking area association information. For example, a building, such as the building 4100 shown in FIG. 4, may be identified as the primary destination, and a target parking location, such as one of the parking areas 4300/4310/4320/4330 shown in FIG. 4, may be identified as the target parking location based on automatically generated parking area association information.

A route may be generated at 5300. In some embodiments, generating the route may include identifying an origin. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 5300 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or a combination thereof, near, or proximal to, the current location of the autonomous vehicle. Generating the route may include determining a route from the origin to the target parking location identified at 5200, or generating a route from the origin to a docking or waypoint location associated with the primary destination, and generating a route from the docking or waypoint location to the target parking location identified at 5200. For simplicity and clarity, the description herein refers to routing and navigation between an origin and a target parking location; however, routing and navigation may include routing and navigation between the origin and a docking location associated with the primary destination and routing and navigation between the docking location and one or more parking areas.

In some embodiments, generating the route may include generating candidate routes from the origin to the target parking location. In some embodiments, a candidate route may represent a unique or distinct route from the origin to the target parking location. For example, a candidate route may include a unique or distinct combination of roads, road segments, lanes, waypoints and interchanges.

In some embodiments, generating the route may include identifying routing states. In some embodiments, identifying routing states may include identifying a routing state corresponding to each waypoint in a candidate route, for each of the candidate routes. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, generating the route may include evaluating the expected action costs for performing an action, such as transitioning from one routing state to another, which may correspond with transitioning from one waypoint to another, and may represent the expected cost of the autonomous vehicle traveling from one location, represented by the first waypoint, to another location, represented by the second waypoint, during execution of the route. In some embodiments, an action may indicate a transition from a routing state to an immediately adjacent routing state, which may correspond with transitioning from a waypoint to an immediately adjacent waypoint without intersecting another waypoint, and may represent an autonomous vehicle traveling from a location, represented by the first waypoint, to another location, represented by the immediately adjacent waypoint.

In some embodiments, an action cost may be determined based on the vehicle transportation network information. For example, within a candidate route, a first routing state may correspond with a first waypoint, which may correspond with a first location in the vehicle transportation network, a second routing state may correspond with a second waypoint, which may correspond with second location in the vehicle transportation network, and the action cost may represent an estimated, predicted or expected cost for the autonomous vehicle to travel from the first location to the second location. In some embodiments, action costs may be context dependent. For example, the action cost for transitioning between two waypoints at one time of day may be significant higher than the action costs for transitioning between the waypoints at another time of day.

In some embodiments, generating the route may include generating probability distributions. In some embodiments, generating the probability distributions may include generating a probable cost distribution for performing an action, such as transitioning from one routing state to another. Generating a probably cost distribution may include determining a probability of successfully performing an action, the probability of failing to perform the action, determining multiple possible costs for performing the action, determining probable costs associating probabilities with possible costs, or a combination thereof.

In some embodiments, generating a probability distribution may include using a normal, or Gaussian, distribution, $N(\mu, \sigma)$, where $\mu$ indicates the mean of the normal distribution, and $\sigma$ indicates the standard deviation. The mean of the normal distribution and the standard deviation may vary from one action to another. In some embodiments, the standard deviation may be augmented based on an action cost uncertainty variance modifier, which may represent variation in the uncertainty of action costs.

In some embodiments, generating a probability distribution may include generating discrete cost probability combinations for an action. For example, for an action in a route, generating a probability distribution may include generating a first probable cost as a combination of a first action cost, such as 45, and a first probability, such as 0.05, and generating a second probable cost as a combination of a second action cost, such as 50, and a second probability, such as 0.08.

In some embodiments, generating a probability distribution may include using a liner model of resources and costs. For example, the probability distribution for the travel time associated with an action may be represented by piece-wise constant functions, and the costs for performing an action may be represented by piece-wise linear functions.

In some embodiments, determining the action cost may include evaluating cost metrics, such as a distance cost metric, a duration cost metric, a fuel cost metric, an acceptability cost metric, or a combination thereof. In some embodiments, the cost metrics may be determined dynamically or may be generated, stored and accessed from memory, such as in a database. In some embodiments, determining the action cost may include calculating a cost function based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. In some embodiments, an acceptability factor may indicate that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics may include weighting the cost metrics and calculating the action cost based on the weighted cost metrics. Weighting a cost metric may include identifying a weighting factor associated with the cost metric. For example, identifying a weighting factor may include accessing a record indicating the weighting factor and an association between the weighting factor and the cost metric. In some embodiments, weighting a cost metric may include generating a weighted cost metric based on the weighting factor and the cost metric. For example, a weighted cost metric may be a product of the weighting factor and the cost metric. In some embodiments, estimating the action cost may include calculating a sum of cost metrics, or a sum of weighted cost metrics.

In some embodiments, generating the route may include identifying an optimal route. Identifying the optimal route may include selecting a candidate route from the candidate routes based on the probability distributions. For example, a candidate route having a minimal probable route cost may be identified as the optimal route. In some embodiments, identifying the optimal route may include using a constant time stochastic control process, such as a hybrid Markov decision process.

In some embodiments, identifying the optimal route may include selecting the minimum probable action cost from among an action cost probability distribution for transitioning from a first routing state to a second routing state and an action cost probability distribution for transitioning from the first routing state to a third routing state.

In some embodiments, identifying the optimal route may include generating a route cost probability distribution for a candidate route based on the action cost probability distributions for each action in the route. In some embodiments, identifying the optimal route may include generating a route cost probability distribution for each candidate route and selecting the candidate route with the lowest, or minimum, probable route cost as the optimal route.

In some embodiments, the controller may output or store the candidate routes, the optimal route, or both. For example, the controller may store the candidate routes and the optimal route and may output the optimal route to a trajectory controller, vehicle actuator, or a combination thereof, to operate the autonomous vehicle to travel from the origin to the target parking location using the optimal route.

In some embodiments, the vehicle may travel from the origin to the target parking location using the optimal route at 5400. For example, the autonomous vehicle may include a vehicle actuator, such as the actuator 1240 shown in FIG. 1, and the vehicle actuator may operate the autonomous vehicle to begin traveling from the origin to the target parking location using the optimal route. In some embodiments, the vehicle may include a trajectory controller and the trajectory controller may operate the vehicle to begin travelling based on the optimal route and current operating characteristics of the vehicle, and the physical environment surrounding the vehicle.

In some embodiments, the optimal route may be updated. In some embodiments, updating the optimal route may include updating or regenerating the candidate routes and probability distributions, and identifying the updated optimal route from the updated or regenerated candidate routes and probability distributions.

In some embodiments, the optimal route may be updated based on updated vehicle transportation network information, based on differences between actual travel costs and the probable costs of the selected route, or based on a combination of updated vehicle transportation network information and differences between actual travel costs and the probable costs of the selected route.

In some embodiments, the autonomous vehicle may receive current vehicle transportation network state information before or during travel. In some embodiments, the autonomous vehicle may receive current vehicle transportation network state information, such as off-vehicle sensor information, from an off-vehicle sensor directly, or via a network, such as the electronic communication network 2300 shown in FIG. 2. In some embodiments, the optimal route may be updated in response to receiving current vehicle transportation network state information. For example, the current vehicle transportation network state information may indicate a change of a state, such as a change from open to closed, of a portion of the vehicle transportation network that is included in the optimal route, updating the candidate routes may include removing candidate routes including the closed portion of the vehicle transportation network and generating new candidate routes and probability distributions using the current location of the autonomous vehicle as the origin, and updating the optimal route may include identifying a new optimal route from the new candidate routes.

In some embodiments, the autonomous vehicle may complete traveling to the target parking location from the current location of the autonomous vehicle using the updated optimal route.

In some implementations, identifying the vehicle transportation network information at 5100 may include or be supplemented by a process that identifies parking area information representing one or more parking areas in the vehicle transportation network and optionally generates parking area association information that describes associations between parking areas and destinations. Examples of such a process are shown in FIGS. 6-8D. While this process is described as operating with autonomous vehicles, it can be implemented on non-autonomous vehicles.

Figure 6:
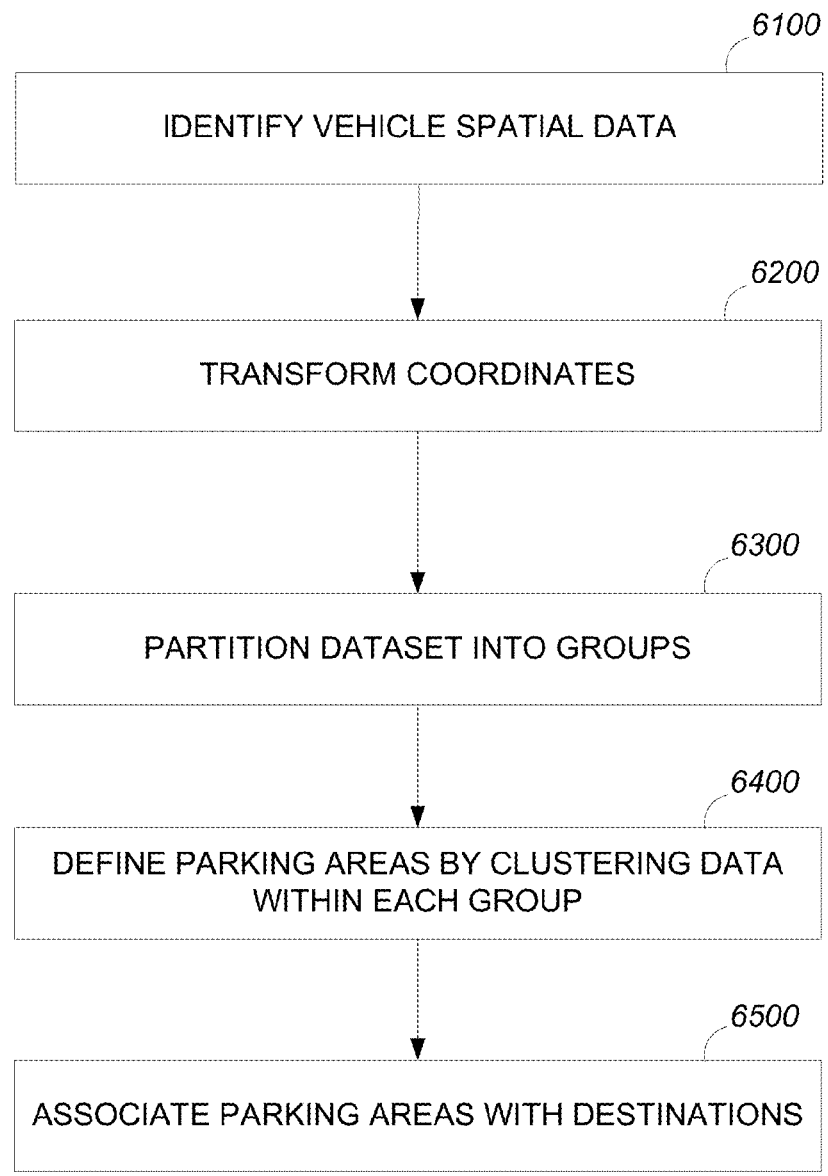
FIG. 6 is a diagram of a method of automatically identifying parking area information in accordance with this disclosure.

FIG. 6 is a diagram of a method of automatically identifying parking area information in accordance with this disclosure. In some embodiments, automatically identifying parking area information may include identifying vehicle spatial data at 6100, transforming the coordinates at 6200, partitioning datasets into groups at 6300, defining parking areas by clustering data within each group at 6400, and associating parking areas with destinations at 6500, or a combination thereof.

Identifying vehicle spatial data at 6100 may include, for example, importing vehicle spatial or location data from one or more datasets. In one example, the vehicle spatial data is imported from signals sent through the wireless electronic communication medium 1500 from the location unit 1310 of FIG. 1. The vehicle spatial data may be associated with records from a single vehicle or multiple vehicles. Each record in a dataset may be associated with a vehicle identifier, and individual vehicles may be uniquely identified based on the vehicle identifiers. The records may also include date and time stamps, and more than one record may be associated with the vehicle spatial data. For example, vehicle spatial data may be retrieved periodically. When a vehicle remains at the same location for longer than the sampling period, two records would be generated with the same, or nearly the same, vehicle spatial data. The collection of vehicle spatial data is not limited to any particular technique provided that it can associate the vehicle spatial data with at least one other piece of information such as time and/or date, target location (as opposed to resulting location), a period or duration between a vehicle stop event and a subsequent vehicle start event, etc.

In some embodiments, vehicle spatial data may be obtained from a location of an infrastructure device in the vehicle transportation network, such as a defined parking area. For example, a parking meter may identify a vehicle entering the parking area, may record a time, a date, or both, associated with the vehicle entering the parking area, may detect the vehicle exiting the parking area, may record a time, a date, or both of the vehicle exiting the parking area, and may report a supplementary parking operation for the vehicle indicating a defined location of the infrastructure device, the vehicle, the enter time, the exit time, or a combination thereof. Generally, such infrastructure devices may include a smart parking meter, a parking camera, a parking access device, or any other non-vehicle device associated with a parking area and capable of detecting, or being detected by, a vehicle.

In some embodiments, the vehicle spatial data may be retrieved from a portable device while it is associated with a vehicle. For example, a portable device, such as a smartphone, carried by a passenger of the vehicle may include geographic location information, such as GPS or assisted GPS (AGPS) information and may include information associating the passenger with the vehicle.

Desirably, the collection frequency for vehicle spatial data is set to an interval that distinguishes parking events from temporary stops, such as fifteen minutes or more. More frequent collection of data is possible, however. Further, not all datasets need to be sampled or retrieved at the same interval. For example, vehicle spatial data from infrastructure devices may be imported or retrieved less frequently than such data from vehicles themselves.

While this disclosure uses the vehicle spatial data for the identification of parking areas as an example, the vehicle spatial data may be used to find location similarity between two or more datasets by clustering the vehicle spatial data.

At 6200, the coordinates of the identified vehicle spatial data are transformed to a common coordinate system. The common coordinate system may be, in some embodiments, the Universal Transverse Mercator (UTM) coordinate system such that the input points are transformed to UTM coordinates in each UTM zone. For example, when the vehicle spatial data is imported as GPS coordinates, the vehicle spatial data may be identified from the datasets may be transformed to UTM coordinates according to known conversion formulas. Other coordinate systems are possible as long as the selected system is used consistently for the input points.

Partitioning the dataset into groups at 6300 may involve partitioning all input data points into groups based on other data associated the points. For example, the dataset may be partitioned based on vehicle such that each group of points is associated with a single vehicle or with groups of vehicles. In one implementation of this example, fleet vehicles for various entities may be separately grouped. In another example, the dataset may be partitioned based on time, day and/or date. In one implementation of this example, the dataset may be partitioned based into windows of time, such as morning, afternoon and night. In another implementation of this example, the dataset may be partitioned into weekday and weekend data, either with or without further partitioning into time windows.

As is clear from this latter example, the dataset may be partitioned into various levels of detail. Further, the entire dataset may be partitioned by more than one associated piece of data. Where infrastructure devices are transmitting vehicle spatial data, for example, the data may be partitioned such that the infrastructure devices are assigned to the same group while other vehicle spatial data is partitioned using a time, day and/or date. In an example where data for fleet vehicles is partitioned from that of other vehicles, groups may be formed by further partitioning the fleet vehicle data into time of day and/or day of the week. Other ways of partitioning the entire dataset are possible.

Figure 7:
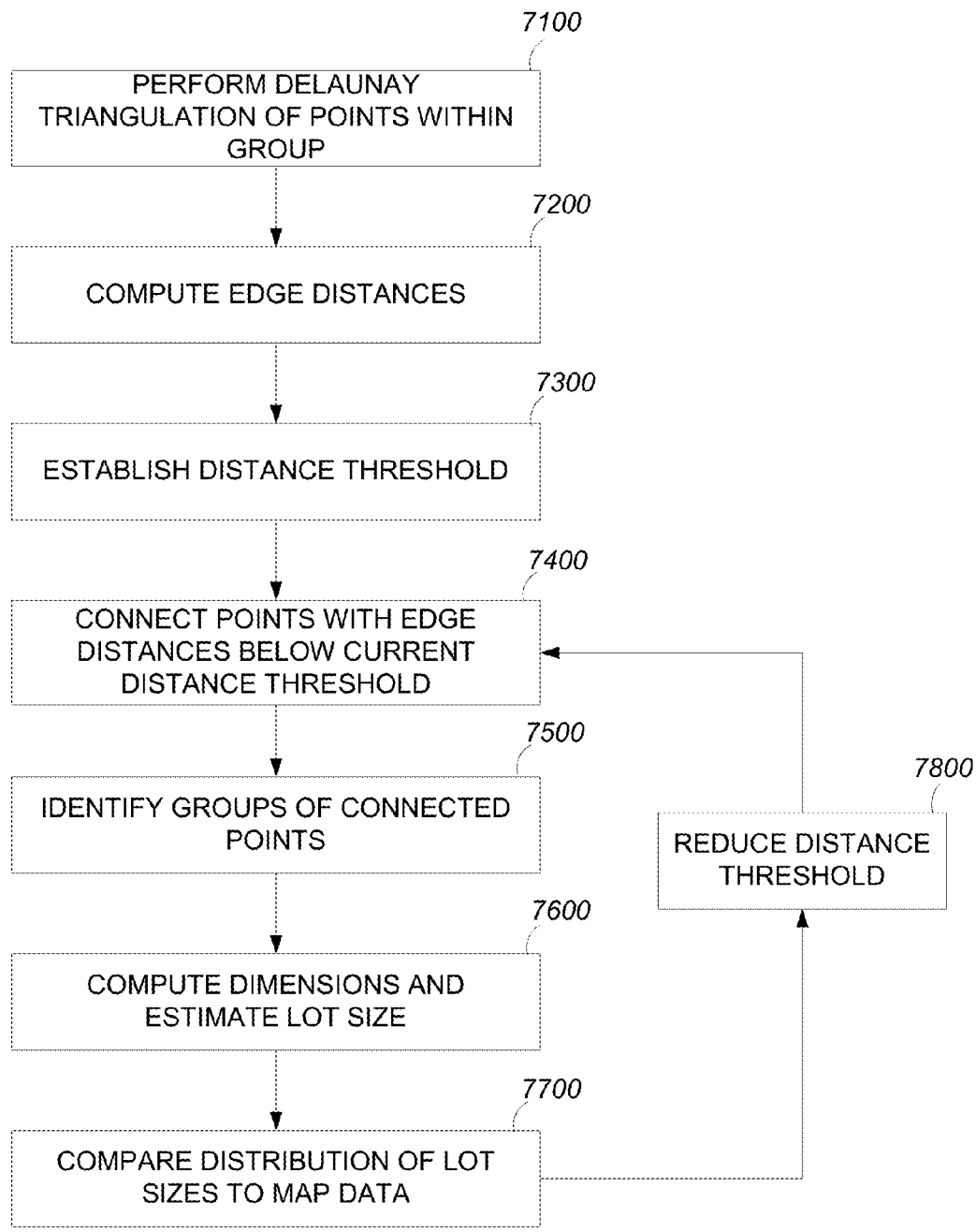
FIG. 7 is a diagram of a method of performing spatial clustering in accordance with one implementation of the method of FIG. 6.

However the entire dataset is partitioned into groups at 6300, spatial clustering is performed on the group at 6400 to, in this example, define parking areas. This process is described below with respect to FIG. 7. Each cluster record so generated is assigned a cluster ID. In the process of FIG. 7, each cluster ID represent a parking area. While there are various uses for the cluster records, one use for the cluster records is to associate parking areas with destinations at 6500.

In some embodiments, associating parking areas with destinations at 6500 may include identifying a destination location associated with the cluster ID and including parking area association information in the parking area information describing the association between the parking area and the destination. There are various techniques that may be used to associate a particular cluster ID, and hence a particular parking area, with a destination. Where the cluster ID corresponds to a known parking lot as described with respect to FIG. 7, the known parking lot may already be associated with one or more destinations. Accordingly, associating the parking area with a destination may involve updating the data for the known parking area with the spatial data of the cluster ID. This may include adding further GPS coordinates to the known parking area to reflect the existence of noise. Whether the cluster ID identifies a known or unknown parking lot, associating the parking area with a destination may involve identifying one or more destinations of the vehicles whose spatial data forms a cluster at 6400, and associating the cluster ID with each of the destinations.

There are a number of ways that the destination or destinations may be identified, so the technique used at 6500 is not particularly limited. One technique is to identify a target location for the vehicle associated with the spatial data. This could include data received from the vehicle other than GPS data, such as trip start address or trip destination. For example, a cluster ID corresponding to the parking area 3200 of FIG. 3 may be associated with discrete uniquely identifiable geolocation, such as the geographic location 3500 or entrance 3600 shown in FIG. 3.

FIG. 7 is a diagram of a method of performing spatial clustering in accordance with one implementation of the method of FIG. 6. The method of FIG. 7 is explained with reference to FIGS. 8A-8D.

Figure 8A:
FIGS. 8A-8D are diagrams of a portion of a vehicle transportation network illustrating the method of FIG. 7 where

At 7100, spatial clustering of a partitioned group of input points is performed. Desirably, the spatial clustering is a Delaunay triangulation. Spatial clustering techniques often develop a point-to-point dissimilarity/distance matrix. Namely, a distance between every two point pair within all of the points being clustered is captured. Thus, for n input points, an $n^2$ matrix is required to hold the information. This results in heavy time and memory requirements for large datasets. In contrast a Delaunay triangulation develops an edge vector whose size is linearly proportional to the input data set. This captures point proximity information in a manner that is less computationally-intensive that a dissimilarly matrix. A Delaunay triangulation applies triangulation to a set of points in a plane such that no point in the set is inside the circumcircle of any triangle. Referring to FIG. 8A, for example, a destination address 8100 and input points 8200 are shown in map data of vehicle transportation network information. In this example, the input points 8200 represent one partitioned group of points from a larger dataset. The input points 8200 may represent vehicle spatial data acquired over a time period of 8:00 am to 5:00 pm of weekdays, for example.

Figure 8B:
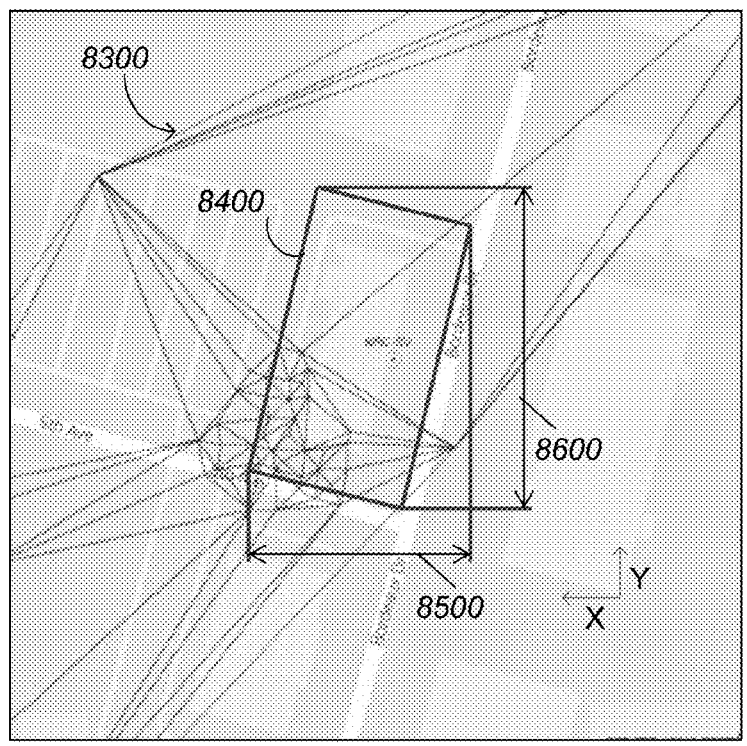

Referring again to FIG. 7, edge distances for edges resulting from the Delaunay triangulation are computed at 7200. Edge distances reflect the distances between respective vertices of each triangles from the triangulation and may also be called edge lengths herein. At 7300, a distance threshold is established for filtering the edge distances. The distance threshold is a measure of proximity. Establishing a distance threshold allows the technique to adapt to the variations in sizes of parking lots or areas while still differentiating one parking area from another. Desirably, the edge distance threshold is set at a maximum acceptably proximity at 7300. In one example, this is a fixed value of 20 meters, but other values are possible based on, e.g., the geographical area. FIG. 8B shows the edges (also called edge vectors) forming the triangles of the Delaunay triangulation for the input points 8200.

Once the distance threshold is established at 7300, points connected with edge distance below the current distance threshold are connected at 7400. Groups of connected points are identified at 7500 using the results of 7400. For example, and referring to FIG. 8C, edges of less than 15 meters are highlighted. This may be the output of 7400. At 7500, the points encompassed by these edges form a group. Other points are excluded from this group and may form their own group. When forming groups, a further filtering step may be used to eliminate sparse data, such as multiple data points that are associated with a single location and single vehicle.

The groups are next associated with parking areas. As shown in the example of FIG. 7, dimensions of one or more possible discovered parking lots, i.e., each found cluster, is computed such that a lot size is estimated at 7600. According to one implementation, the dimensions are computed by calculating the differences between the maximum and minimum X-coordinates and Y-coordinates, respectively, for the points of the vehicle spatial data forming the cluster. These differences between the maxima and minima represent an estimated size of a parking lot that would encompass the data points in the X- and Y-directions.

According to some embodiments, the distribution of lot sizes may be compared to known parking lots in map data at 7700. Referring back to FIG. 8B, for example, the dimensions of the parking lot 8400 may be computed by taking the longest dimension in two orthogonal directions. The outer limits of the known parking lot or lots may be represented by coordinates in the common coordinate system into which the vehicle spatial data was converted. Because parking lots may be arranged in any orientation, one desirable implementation computes the dimensions along a common set of axes in the plane of the map data such as the X-Y axes as shown in FIG. 8B for comparison with the lot sizes estimated at 7600. The map data uses the common coordinate system into which the vehicle spatial data is converted. In FIG. 8B, arrow 8500 represents the dimension of the parking lot 8400 in the X-direction and arrow 8600 represents the dimension of the parking lot 8400 in the Y-direction.

Figure 8C:
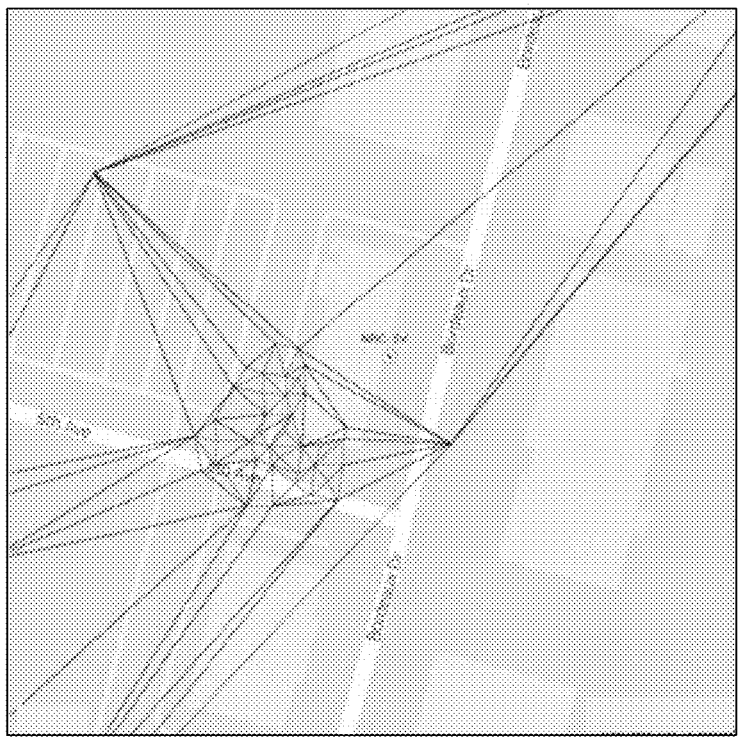
Figure 8D:
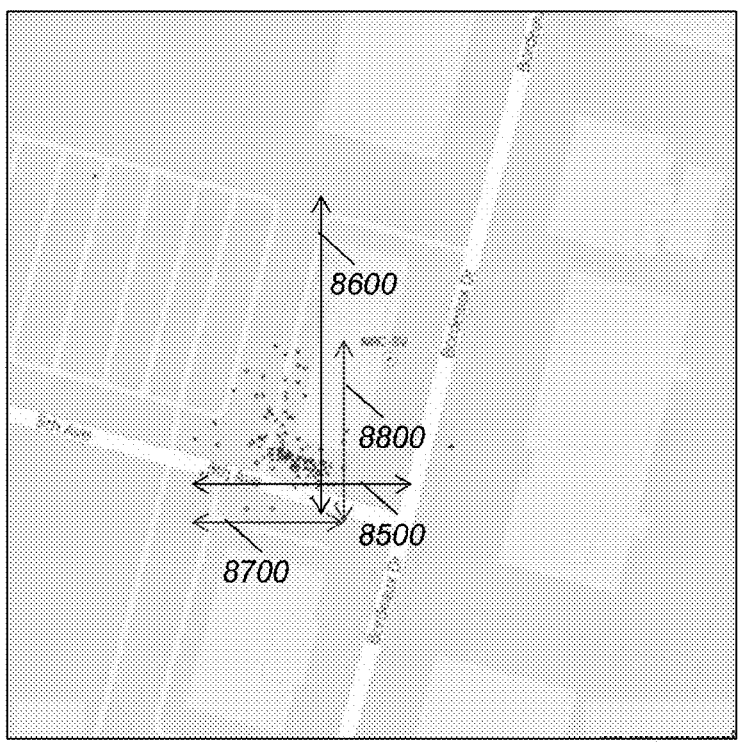

The comparison of the cluster dimensions to the available parking lot sizes may be done for a locality relatively near to the location of the points within the cluster. Due to noise, the points may or may not be located within the bounds of a known parking lot. However, at least some of the points should overlap the known boundaries of the parking lot. In this way, the search area for the comparison may be bounded. An example of the comparison of 7700 is shown in FIG. 8D. The cluster of FIG. 8C is repeated in FIG. 8D and has dimensions represented by arrow 8700 in the X-direction and arrow 8800 in the Y-direction. While some of the points are outside of the polygon defining the known parking lots, the estimated lot size associated with the cluster is smaller than the dimensions of the known parking lot, indicating a match. Equal dimensions would also represent a match.

Finding a match as a result of the comparison of 7700 can end the clustering for the current group. Optionally, further processing may be performed to check the cluster medians against the actual coordinates of the polygon defining the known parking lots for exact mapping to a known parking lot. By comparing the distribution of lot sizes (i.e., the dimensions of various clusters) to the map data, the likelihood of identifying clusters with an incorrect lot can be reduced. This also provides a technique with the flexibility to deal with large variations in the sizes of parking lots. In some implementations, however, the comparison may be done per cluster.

If the clusters in the current group do not match the distribution of known parking lots, the distance threshold may be reduced at 7800 so as to reduce the dimensions of the clusters at 7400. For example, the distance threshold may be reduced from the maximum accepted proximity by a small value such as 0.5 meters. Then, 7500/7600/7700 are repeated using the new distance threshold. This reduction and 7400/7500/7600/7700 may be repeated under the appropriate threshold is reaches such that the discovered dimensions are within the limits of the parking lot dimensions extracted from the map data.

This technique works well when the map data includes known parking lots. However, the map data may not initially have this information, or it may be partially out-of-date. In a modification of the technique of FIG. 7, the comparison of 7700 may be done by comparing the dimensions of the clustered points to the maximum allowable size of a parking lot in the locality of the clustered points. The maximum allowable size of a parking lot in the locality may be based on other map data, such as building sizes, or may be based on known local regulations. It could also be a default value or an input value. Other than 7700, the method of FIG. 7 would remain unchanged in some embodiments.

Location signals from vehicle are susceptible to noise. Identifying vehicle spatial data (e.g., GPS points) as belonging to the same location, i.e., a parking lot, allows for user preferences to be more easily understood. The teachings herein may be used to map trips to their respective parking lots such that data about each parking lot may be extracted, such as median duration, overnight parking, etc., that provides insight into consumer use. Using spatial clustering as opposed to, for example, a polygon containment check is useful in dealing with GPS noise as well as avoiding the heavy computation required to check each and every point within a polygon representing a parking lot within the map data. The teachings herein also provide a technique to identify parking lots not defined or updated in the map data.

The above-described aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A vehicle comprising:
a processor configured to execute instructions stored on a non-transitory computer readable medium to:
identify vehicle transportation network information representing a vehicle transportation network, the vehicle transportation network including a primary destination, wherein identifying the vehicle transportation network information includes identifying the vehicle transportation network information such that the vehicle transportation network information includes parking area information representing a plurality of parking areas, wherein a parking area is associated with a location in the vehicle transportation network by:
identifying a plurality of coordinates representing vehicle spatial data;
partitioning the plurality of coordinates into at least two groups of vehicle locations based on at least one condition existing when the plurality of coordinates was identified;
clustering, using a spatial clustering technique, the vehicle spatial data for a first group of the at least two groups of vehicle locations based on proximity of the plurality of coordinates forming the first group, the spatial clustering technique forming at least a first cluster of the vehicle spatial data;
comparing dimensions of the first cluster with location data within the vehicle transportation network information indicating dimensions of at least one parking area, the dimensions of the cluster representing an estimated size of a parking area encompassing the plurality of coordinates forming the first cluster; and
based on the comparing, defining a location of the first cluster as the parking area;
determine a target parking area from the plurality of parking areas as the primary destination based on the vehicle transportation network information;
identify a route from an origin to the primary destination in the vehicle transportation network using the vehicle transportation network information; and
a trajectory controller configured to route the vehicle to travel from the origin to the primary destination using the route.

2. A vehicle comprising:
a processor configured to execute instructions stored on a non-transitory computer readable medium to:
identify vehicle transportation network information representing a vehicle transportation network, the vehicle transportation network including a primary destination, wherein identifying the vehicle transportation network information includes identifying the vehicle transportation network information such that the vehicle transportation network information includes parking area information representing a plurality of parking areas, wherein each parking area from the plurality of parking areas is associated with a respective location in the vehicle transportation network by:
identifying a plurality of coordinates representing vehicle spatial data;
partitioning the plurality of coordinates into at least two groups of vehicle locations based on at least one condition existing when the plurality of coordinates was identified;
clustering the vehicle spatial data for a first group of the at least two groups of vehicle locations based on proximity, wherein clustering the vehicle spatial data for the first group of the at least two groups of vehicle locations based on proximity comprises:
performing a Delaunay triangulation of the plurality of coordinates within the first group;
calculating a respective edge length for edges of the Delaunay triangulation; and
identifying at least one group of points of the vehicle spatial data connected by those of the edges having an edge length below a distance threshold as at least one cluster of the clustered vehicle data, dimensions of the clustered vehicle spatial data obtained from each cluster;
comparing the dimensions of the clustered vehicle spatial data for the first group with other location data within the vehicle transportation network information; and
defining a respective location of the clustered vehicle spatial data as a parking area of the plurality of parking areas;
determine a target parking area from the plurality of parking areas as the primary destination based on the vehicle transportation network information; and
identify a route from an origin to the primary destination in the vehicle transportation network using the vehicle transportation network information; and
a trajectory controller configured to route the vehicle to travel from the origin to the primary destination using the route.

3. The vehicle of claim 2, wherein each parking area from the plurality of parking areas is associated with a respective location in the vehicle transportation network by calculating the dimensions of the clustered vehicle spatial data obtained from the at least one group of points by:

calculating a first difference between maximum and minimum coordinates in a first direction of an orthogonal coordinate system for each group of points; and calculating a second difference between maximum and minimum coordinates in a second direction of the orthogonal coordinate system for each group of points.

4. The vehicle of claim 3, wherein the first difference and the second difference for each group of points defines a discovered parking lot size for a cluster of the clustered vehicle spatial data, and wherein comparing the dimensions of the clustered vehicle spatial data for the first group with other location data within the vehicle transportation network information comprises:

comparing a distribution of the discovered parking lot sizes to a distribution of known parking lot sizes for locations of each cluster relative to map data of the vehicle transportation network information; and wherein defining a respective location of the clustered vehicle spatial data as a parking area of the plurality of parking areas comprises:

identifying each cluster as a parking area of the plurality of parking areas when the distribution of the discovered parking lot sizes matches the distribution of known parking lot sizes.

5. The vehicle of claim 2, wherein comparing the dimensions of the clustered vehicle spatial data for the first group with other location data within the vehicle transportation network information comprises:

comparing the dimensions of each cluster of the clustered vehicle spatial data to a maximum allowable parking lot size for locations of each cluster relative to map data of the vehicle transportation network information; and wherein defining a respective location of the clustered vehicle spatial data as a parking area of the plurality of parking areas comprises:

identifying each cluster as a parking area of the plurality of parking areas when a respective size of each cluster is at or below the maximum allowable parking lot size.

6. The vehicle of claim 5, wherein clustering the vehicle spatial data for the first group of the at least two groups of vehicle locations based on proximity comprises, when a respective size of each cluster is above the maximum allowable parking lot size:

reducing the distance threshold to an updated distance threshold;

identifying at least one group of points of the vehicle spatial data connected by those of the edges having an edge length below the updated distance threshold as at least one updated cluster of the clustered vehicle data, the dimensions of the clustered vehicle spatial data obtained from each updated cluster; wherein comparing the dimensions of the clustered vehicle spatial data for the first group with other location data within the vehicle transportation network information comprises:

comparing the dimensions of each updated cluster of the clustered vehicle spatial data to the maximum allowable parking lot size for locations of each updated cluster relative to the map data of the vehicle transportation network information; and wherein defining a respective location of the clustered vehicle spatial data as a parking area of the plurality of parking areas comprises:

identifying each updated cluster as a parking area of the plurality of parking areas when a respective size of each updated cluster is at or below the maximum allowable parking lot size.

7. The vehicle of claim 2, wherein comparing the dimensions of the clustered vehicle spatial data for the first group with other location data within the vehicle transportation network information comprises:

comparing a distribution of the dimensions of each cluster of the clustered vehicle spatial data to a distribution of known parking lot sizes for locations of each cluster relative to map data of the vehicle transportation network information; and wherein defining a respective location of the clustered vehicle spatial data as a parking area of the plurality of parking areas comprises:

identifying each cluster as a parking area of the plurality of parking areas when the distribution of the dimensions of each cluster matches the distribution of known parking lot sizes.

8. The vehicle of claim 7, wherein clustering the vehicle spatial data for the first group of the at least two groups of vehicle locations based on proximity comprises, when the distribution of the dimensions of each cluster does not match the distribution of known parking lot sizes:

reducing the distance threshold to an updated distance threshold;

identifying at least one group of points of the vehicle spatial data connected by those of the edges having an edge length below the updated distance threshold as at least one updated cluster of the clustered vehicle data, the dimensions of the clustered vehicle spatial data obtained from each updated cluster; wherein comparing the dimensions of the clustered vehicle spatial data for the first group with other location data within the vehicle transportation network information comprises:

comparing a distribution of the dimensions of each updated cluster of the clustered vehicle spatial data to the distribution of known parking lot sizes for locations of each cluster relative to map data of the vehicle transportation network information; and wherein defining a respective location of the clustered vehicle spatial data as a parking area of the plurality of parking areas comprises:

identifying each updated cluster as a parking area of the plurality of parking areas when the distribution of the dimensions of each updated cluster matches the distribution of known parking lot sizes.

9. The vehicle of claim 1, wherein identifying the plurality of coordinates representing vehicle spatial data comprises sampling global positioning system (GPS) coordinates from a plurality of vehicles at defined intervals of time.

10. The vehicle of claim 9, wherein the parking area is associated with the location in the vehicle transportation network by:

converting the GPS coordinates of the plurality of coordinates forming the first cluster to Universal Transverse Mercator (UTM) coordinates.

11. The vehicle of claim 1, wherein the vehicle is an autonomous vehicle.

12. The vehicle of claim 1, wherein partitioning the plurality of coordinates into at least two groups of vehicle locations based on at least one condition existing when the plurality of coordinates was identified comprises:

partitioning the plurality of coordinates into the at least two groups such that each group includes coordinates of the plurality of coordinates obtained at different time windows.

13. A vehicle comprising:

a processor configured to execute instructions stored on a non-transitory computer readable medium to:

identify vehicle transportation network information representing a vehicle transportation network, the vehicle transportation network including a primary destination, wherein identifying the vehicle transportation network information includes identifying the vehicle transportation network information such that the vehicle transportation network information includes parking area information representing a plurality of parking areas, wherein a parking area is associated with a location in the vehicle transportation network by:
  identifying a plurality of coordinates representing vehicle spatial data from a plurality of vehicles;
  partitioning the plurality of coordinates into at least two groups of vehicle locations based on at least one condition existing when the plurality of coordinates was identified, wherein the at least one condition comprises a time of day;
  forming at least a first cluster of coordinates by clustering the vehicle spatial data for a first group of the at least two groups of vehicle locations based on proximity of the plurality of coordinates forming the first group to each other;
  comparing spatial dimensions of the first cluster with location data within the vehicle transportation network information indicating a candidate parking area; and
  defining a location of the first cluster as the parking area responsive to the spatial dimensions of the first cluster conforming to the candidate parking area; and
determine a target parking area from the plurality of parking areas as the primary destination based on the vehicle transportation network information,
identify a route from an origin to the primary destination in the vehicle transportation network using the vehicle transportation network information; and
a trajectory controller configured to route the vehicle to travel from the origin to the primary destination using the route.

14. The vehicle of claim 13, wherein the vehicle transportation network includes a plurality of destinations that includes the primary destination and wherein the processor is configured to execute instructions stored on the non-transitory computer readable medium to identify the vehicle transportation network information such that at least some of the plurality of coordinates are associated with a respective destination from the plurality of destinations and such that at least one parking area from the plurality of parking areas is associated with the primary destination.

15. The vehicle of claim 14, wherein the processor is configured to execute instructions stored on the non-transitory computer readable medium to associate the at least one parking area from the plurality of parking areas with the primary destination by:
  comparing destinations associated with the plurality of coordinates defining each parking area of the plurality of parking areas with the primary destination; and
  associating the at least one parking area from the plurality of parking areas with the primary destination when the primary destination is among the destinations associated with the plurality of coordinates defining the at least one parking area.

16. The vehicle of claim 13, wherein the time of day comprises a time window.

17. The vehicle of claim 13, wherein the vehicle is an autonomous vehicle.

18. The vehicle of claim 13, wherein clustering the vehicle spatial data comprises:
  performing a Delaunay triangulation of the plurality of coordinates within the first group to form at least the first cluster having an edge length below a distance threshold.

19. The vehicle of claim 13, wherein the location data comprises dimensions of a polygon forming the candidate parking area within the vehicle transportation network information.

20. The vehicle of claim 19, wherein the dimensions of the first cluster conform to the candidate parking area when the dimensions of the first cluster fit within the polygon.

21. The vehicle of claim 13, wherein the candidate parking area comprises a maximum allowable size of parking areas in a locality of the first cluster within the vehicle transportation network information.

* * * * *